United States Patent
Ohguro

(10) Patent No.: US 7,580,571 B2
(45) Date of Patent: Aug. 25, 2009

(54) METHOD AND APPARATUS FOR DETECTING AN ORIENTATION OF CHARACTERS IN A DOCUMENT IMAGE

(75) Inventor: Yoshihisa Ohguro, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 489 days.

(21) Appl. No.: 11/183,852

(22) Filed: Jul. 19, 2005

(65) Prior Publication Data

US 2006/0018544 A1    Jan. 26, 2006

(30) Foreign Application Priority Data

Jul. 20, 2004    (JP)    ............... 2004-211884

(51) Int. Cl.
    *G06K 9/00*    (2006.01)
(52) U.S. Cl. ...................... 382/181; 382/276
(58) Field of Classification Search ................. 382/181, 382/182, 185, 276; 704/9
    See application file for complete search history.

(56) References Cited

U.S. PATENT DOCUMENTS

| | | | | |
|---|---|---|---|---|
| 2,905,927 | A * | 9/1959 | Reed | 382/201 |
| 4,926,490 | A * | 5/1990 | Mano | 382/177 |
| 4,933,979 | A * | 6/1990 | Suzuki et al. | 382/173 |
| 5,031,225 | A * | 7/1991 | Tachikawa et al. | 382/185 |
| 5,276,742 | A * | 1/1994 | Dasari et al. | 382/297 |
| 5,646,840 | A * | 7/1997 | Yamauchi et al. | 704/2 |
| 5,652,896 | A * | 7/1997 | Yamauchi et al. | 704/2 |
| 5,675,815 | A * | 10/1997 | Yamauchi et al. | 715/236 |
| 5,845,143 | A * | 12/1998 | Yamauchi et al. | 704/2 |
| 6,532,303 | B2 * | 3/2003 | Saiga | 382/198 |
| 6,798,905 | B1 * | 9/2004 | Sugiura et al. | 382/168 |
| 6,862,113 | B1 * | 3/2005 | Greene et al. | 358/3.28 |
| 6,920,247 | B1 * | 7/2005 | Mayzlin et al. | 382/185 |
| 2004/0161149 | A1 * | 8/2004 | Kaneda et al. | 382/181 |
| 2005/0027511 | A1 | 2/2005 | Ohguro | |
| 2005/0180632 | A1 * | 8/2005 | Aradhye et al. | 382/182 |
| 2007/0009155 | A1 * | 1/2007 | Potts et al. | 382/182 |

FOREIGN PATENT DOCUMENTS

| | | |
|---|---|---|
| JP | 5-12960 | 2/1993 |
| JP | 11-191135 | 7/1999 |
| JP | 2005-63419 | 3/2005 |

\* cited by examiner

*Primary Examiner*—Samir A. Ahmed
*Assistant Examiner*—Stephen R Koziol
(74) *Attorney, Agent, or Firm*—Dickstein Shapiro LLP

(57) ABSTRACT

An apparatus and method for extracting a predetermined number of consecutive characters from a document image; converting the consecutive characters into a set of symbols using layout information obtained from the consecutive characters; and detecting an orientation of the consecutive characters using occurrence probabilities of the set of symbols.

34 Claims, 7 Drawing Sheets

| TRIGRAM | P (Wi\|Wi-2, Wi-1) | IN (P (Wi\|Wi-2, Wi-1)) * (-1000) |
|---|---|---|
| [s013, s045, s032] | 1.00000 ( 1/ 1) | 0 |
| [s013, s064, s033] | 0.75000 ( 3 /4) | 287 |
| [s015, s005, s221] | 0.23077 ( 6/26) | 1466 |
| [s016, s145, s203] | 1.00000 ( 2/ 2) | 0 |
| [s134, s002, s102] | 0.20896 (14/67) | 1565 |
| [s134, s095, s244] | 1.00000 ( 1/ 1) | 0 |
| [s137, s187, s105] | 0.50000 ( 1/ 2) | 693 |
| [s138, s076, s228] | 0.01923 ( 1/52) | 3951 |
| [s140, s097, s003] | 0.04348 ( 1/23) | 3135 |
| [s141, s045, s013] | 0.04478 ( 3/67) | 3106 |
| . . . | | |

→ s021, s124, s032, sSPC, s048, s012, ...

US 7,580,571 B2

METHOD AND APPARATUS FOR DETECTING AN ORIENTATION OF CHARACTERS IN A DOCUMENT IMAGE

FIELD OF THE INVENTION

The following disclosure relates generally to an image processing apparatus, and more specifically to detecting an orientation of characters in a document image.

DESCRIPTION OF THE RELATED ART

The existing image processing apparatus can detect an orientation of a document image input for scanning or copying. However, a type of character used in the input image is usually not known. Thus, in order to correctly detect the orientation of the input image, the existing image processing apparatus needs to store a large amount of reference document images for a number of languages and for each of its orientations. Consequently, the existing apparatus requires a large amount of storage. Further, since the existing image processing apparatus needs to compare the input document image with each one of the reference document images, the process of detecting the orientation of input document images is time consuming. Therefore, there is a need for an image processing apparatus that is less cumbersome and can function more efficiently and effectively.

BRIEF SUMMARY OF THE INVENTION

An exemplary embodiment of the present invention includes an apparatus and method capable of extracting a predetermined number of consecutive characters from a document image; converting the consecutive characters into a set of symbols using layout information obtained from the consecutive characters; and detecting an orientation of the consecutive characters using occurrence probabilities of the set of symbols.

Another exemplary embodiment of the present invention includes an apparatus and method extracting one or more character lines from a document image, each of the character lines having a plurality of consecutive characters; converting the character line into a set of symbols using layout information obtained from the character line; detecting an orientation of the character line using occurrence probabilities of the set of symbols; and determining an orientation of the document image based on the detected orientations of the character lines.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4A is a horizontal character line extracted from a document image having a horizontal character line rotated by 0 degree from the upright position, according to an exemplary embodiment of the present invention;

FIG. 4B is a horizontal character line extracted from a document image having a horizontal character line rotated by 180 degrees from the upright position, according to an exemplary embodiment of the present invention;

FIG. 4C is a horizontal character line extracted from a document image having a vertical character line rotated by 90 degrees from the upright position, according to an exemplary embodiment of the present invention;

FIG. 4D is a horizontal character line extracted from a document image having a vertical character line rotated by 270 degrees from the upright position, according to an exemplary embodiment of the present invention;

DETAILED DESCRIPTION OF THE INVENTION

Figure 1:
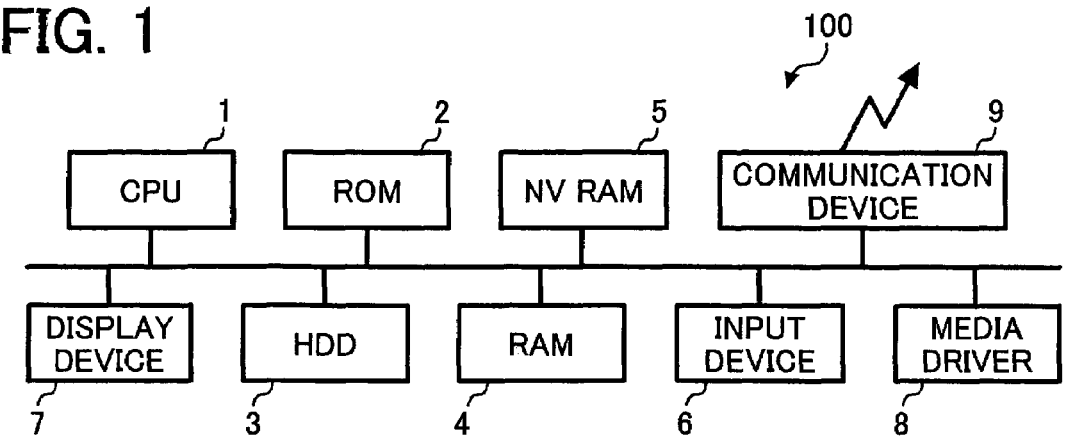
FIG. 1 is a schematic block diagram illustrating an image processing apparatus according to an exemplary embodiment of the present invention.

In describing the preferred embodiments illustrated in the drawings, specific terminology is employed for clarity. However, the disclosure of this patent specification is not intended to be limited to the specific terminology selected and it is to be understood that each specific element includes all technical equivalents that operate in a similar manner. Referring now to the drawings, wherein like reference numerals designate identical or corresponding parts throughout the several views, FIG. 1 illustrates an image processing apparatus 100 according to an exemplary embodiment of the present invention.

The image processing apparatus 100 is capable of detecting an orientation of characters in a document image, and determining an orientation of the document image based on the detected orientation of certain characters.

As shown in FIG. 1, the image processing apparatus 100 includes a central processing unit (CPU) 1, read only memory (ROM) 2, non-volatile random access memory (NVRAM) 5, communication device 9, display device 7, hard disk drive (HDD) 3, random access memory (RAM) 4, input device 6, and media driver 8.

The CPU 1 controls the entire operation of the image processing apparatus 100. The ROM 2 stores a computer program, which causes the CPU 1 to perform a function or an operation of detecting an orientation of characters or a document image, when activated by the CPU 1.

The HDD 3 stores various kinds of data, including a document image input from the outside in various ways. For example, the document image may be scanned by a scanner, if the scanner is provided with the image processing apparatus 100. In another example, the document image may be generated by the image processing apparatus 100 using a word processing program stored in the ROM 2. In yet another example, the document image may be received through the communication device 9 from a communication line or network.

The RAM 4 temporarily stores the document image, which has been read out from the HDD 3, for image processing.

The NVRAM 5 stores one or more n-gram models each trained on a reference document image having one of a number of predetermined orientations. Further, the reference document image may include one or more kinds of reference document images each based on a specific language type.

In this exemplary embodiment, a plurality of n-gram models trained on an Asian reference document image is stored each corresponding to one of the orientations including the orientations HL0, HL90, HL180, HL270, VL0, VL90, VL180, and VL270, as described below. The n-gram models for the orientations HL0, HL90, HL180, and HL270 are trained, respectively, on horizontal character lines of the Asian reference document image having orientations of 0, 90, 180, and 270 degrees from the upright position. The n-gram models for the orientations VL0, VL90, VL180, and VL270 are trained, respectively, on vertical character lines of the Asian reference document image having orientations of 0, 90, 180, and 270 degrees from the upright position. In this exemplary embodiment, the Asian reference document images include characters from the Asian languages of Japanese, Korean, and Chinese. It should be appreciated that this list of languages is not limiting. The present invention can include characters from any language.

Further, in this exemplary embodiment, a plurality of n-gram models trained on a Latin reference document image is stored each corresponding to one of the orientations including the orientations HL0, HL90, HL180, and HL270. The n-gram models for the orientations HL0, HL90, HL180, and HL270 are trained, respectively, on horizontal character lines of the Latin reference document image having orientations of 0, 90, 180, and 270 degrees from the upright position. In this exemplary embodiment, the Latin reference document images include characters from the Latin languages of English, French, Spanish, German, and Italian. It should again be appreciated that this list of languages is not limiting. The present invention can include characters from any language.

The input device 6 includes any kind of device allowing a user to input various data, such as a keyboard or a mouse.

The display device 8 includes any kind of device capable of displaying various data, such as a liquid crystal display.

The media driver 8 includes any kind of device capable of reading data from a recording medium, such as an optical disc apparatus. The recording medium may also store the computer program to be used by the CPU 1.

The communication device 9 includes any kind of device connecting the image processing apparatus 100 to a communication line or a network such as the Internet or a local area network (LAN).

Figure 2:
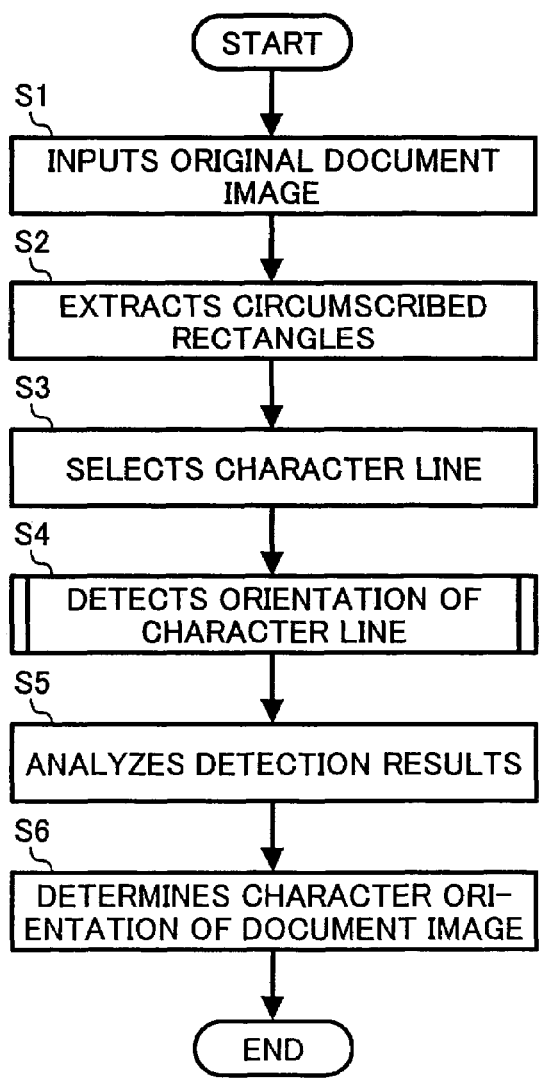
FIG. 2 is a flowchart illustrating an operation of detecting an orientation of characters in a document image, performed by the image processing apparatus of FIG. 1, according to an exemplary embodiment of the present invention.
Figure 3:
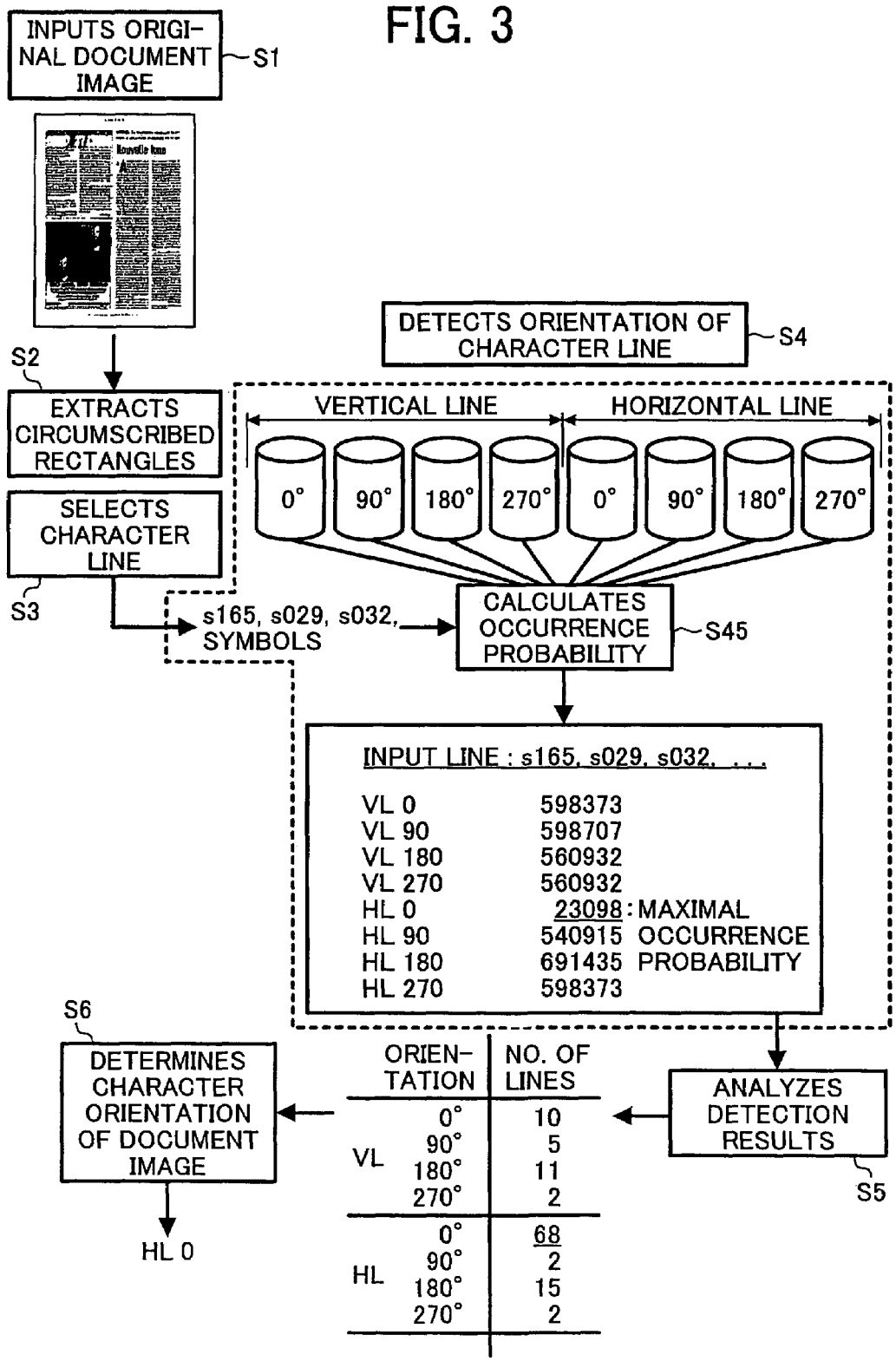
FIG. 3 is an illustration showing an operation of detecting an orientation of characters in a document image, performed by the image processing apparatus of FIG. 1, according to an exemplary embodiment of the present invention.

Referring now to FIGS. 2 and 3, an operation of detecting an orientation of a document image is explained, according to an exemplary embodiment of the present invention. The steps illustrated in FIGS. 2 or 3 are performed by the CPU 1 when command data is inputted by a user using the input device 6.

Step S1 inputs a document image. The document image has a plurality of characters as shown in FIG. 3. In this exemplary embodiment, the characters in the document image include Japanese characters and English characters. However, the document image may include any character of any language.

Step S2 extracts one or more circumscribed rectangles for each of the characters in the document image using any one of the known character recognition methods. Further, Step S2 forms one or more character lines based on the extracted circumscribed rectangles. For example, the CPU 1 extracts a run of black pixels and forms a minimal circumscribed rectangle (hereinafter, referred to as the "circumscribed rectangle") based on the extracted run. The circumscribed rectangles that are located closely are grouped into a character line.

At this time, the orientation of the characters in the document image are not identified. If the circumscribed rectangles are formed into a horizontal character line, four kinds of orientations may be assumed for the characters in the extracted character line, as illustrated in FIGS. 4A-4D. As shown in FIG. 4A, the extracted horizontal character line may correspond to an original horizontal character line having an orientation of 0 degree ("HL0"). As shown in FIG. 4B, the extracted horizontal character line may correspond to an original horizontal character line having an orientation of 180 degrees ("HL180"). As shown in FIG. 4C, the extracted horizontal character line may correspond to an original vertical character line having an orientation of 90 degrees ("VL90"). As shown in FIG. 4D, the extracted horizontal character line may correspond to an original vertical character line having an orientation of 270 degrees ("VL270").

Figure 5A:
FIG. 5A is a vertical character line extracted from a document image having a horizontal character line rotated by 90 degrees from the upright position, according to an exemplary embodiment of the present invention.
Figure 5B:
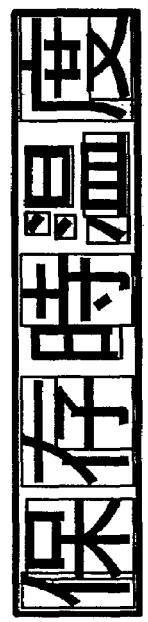
FIG. 5B is a vertical character line extracted from a document image having a horizontal character line rotated by 270 degrees from the upright position, according to an exemplary embodiment of the present invention.
Figure 5C:
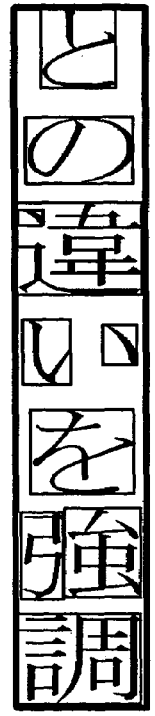
FIG. 5C is a vertical character line extracted from a document image having a vertical character line rotated by 0 degree from the upright position, according to an exemplary embodiment of the present invention.
Figure 5D:
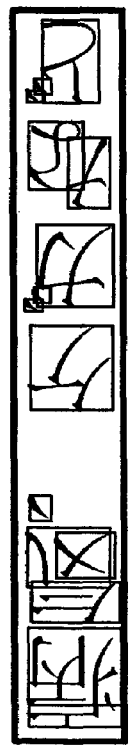
FIG. 5D is a vertical character line extracted from a document image having a vertical character line rotated by 180 degrees from the upright position, according to an exemplary embodiment of the present invention.

In another example, if the circumscribed rectangles are formed into a vertical character line, four kinds of orientations may be assumed for the characters in the extracted character line, as illustrated in FIGS. 5A-5D. As shown in FIG. 5A, the extracted vertical character line may correspond to an original horizontal character line having an orientation of 90 degrees ("HL90"). As shown in FIG. 5B, the extracted vertical character line may correspond to an original horizontal character line having an orientation of 270 degrees ("HL270"). As shown in FIG. 5C, the extracted vertical character line may correspond to an original vertical character line having an orientation of 0 degree ("VL0"). As shown in FIG. 5D, the extracted vertical character line may correspond to an original vertical character line having an orientation of 180 degrees ("VL180").

In this exemplary embodiment, an orientation of a character line or document image is measured clockwise from the upright position of the character line or document image. However, the orientation of a character line or document image may also be measured counterclockwise.

Further, a number of orientations that can be assumed may differ depending on the type of language used in the characters. For example, four orientations including HL0, HL180, HL90, and HL270 can be assumed for the English character line.

Step S3 selects one of the character lines formed in Step S2.

Step S4 detects an orientation of characters in the selected character line, using at least one of the n-gram models stored in the NVRAM 5.

Steps S3 and S4 are performed for each of the character lines formed in Step S2. Accordingly, a detection result indicating an orientation of characters is generated for each of the character lines.

Step S5 analyzes the detection results of the character lines in the document image.

Step S6 determines an orientation of the document image based on the analysis made by Step S5.

Figure 6:
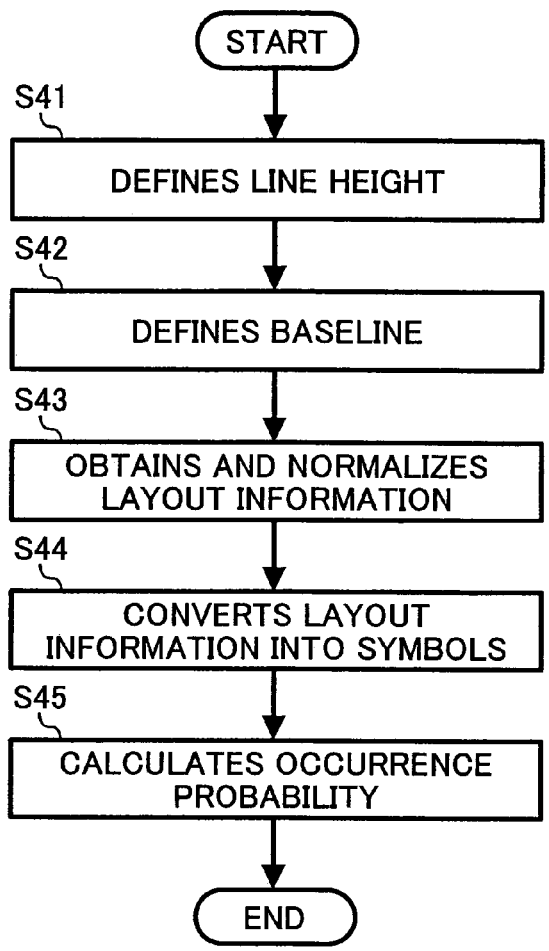
FIG. 6 is a flowchart illustrating an operation of detecting an orientation of a character line, according to an exemplary embodiment of the present invention.

Referring now to FIG. 6, an operation of detecting an orientation of a character line is explained according to an exemplary embodiment of the present invention. The steps illustrated in FIG. 6 are performed in Step S4 of FIGS. 2 and 3, after the CPU 1 selects one of the character lines.

Step S41 defines a height of the character line based on the heights of the circumscribed rectangles in the character line.

Figure 7:
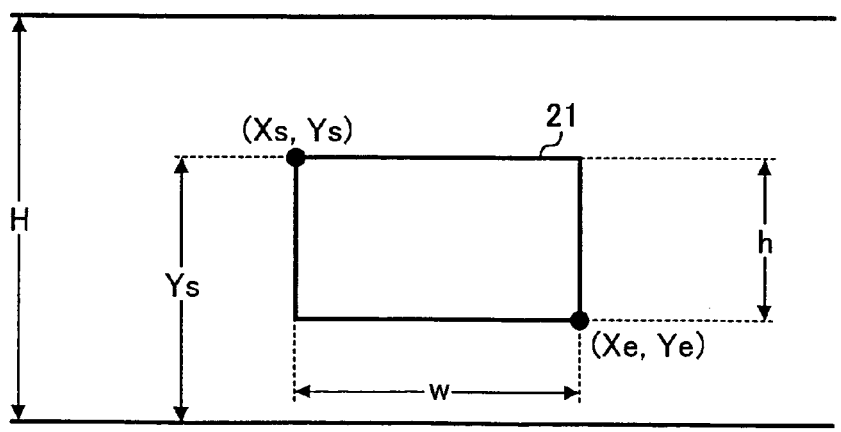
FIG. 7 is an illustration of an exemplary circumscribed rectangle in a character line, according to an exemplary embodiment of the present invention.

For example, as illustrated in FIG. 7, the height H of the character line is preferably set to be larger than the height h of the circumscribed rectangle 21. The circumscribed rectangle 21 may be any one of the circumscribed rectangles belonging to the character line. As shown in FIG. 7, the circumscribed rectangle 21 may be expressed by a starting point (Xs, Ys) positioned at the upper left corner of the circumscribed rectangle and an ending at a point (Xe, Ye) positioned at the lower right corner. The height h of the circumscribed rectangle 21 may be calculated as the difference (Ys−Ye) in Y coordinates of the starting point and the ending point. By setting the height H of the character line to be larger than the height h of the circumscribed rectangle 21, the characters in the character line may be properly identified, even when the character line contains a small-sized character or even when the characters are skewed.

To define the height H of the character line, the height h of the circumscribed rectangle 21 is multiplied by a predetermined constant A. The multiplied height (h*A) is compared with a current value of the height H. If the multiplied height (h*A) is larger than the current value of the height H, the multiplied height (h*A) is used as a current value of the height H. After performing this operation for each of the circumscribed rectangles, the height H is set to be larger than the height of any one of the circumscribed rectangles. For example, the predetermined constant A may be set to 1.2.

Alternatively, the height H of the character line may be calculated using a maximum height hs, which is the largest height value selected from the heights of the circumscribed rectangles in the character line. The maximum height hs is multiplied by a predetermined constant A, and the value of the height H is set to the multiplied height (hs*A).

Step S42 defines a baseline of the character line using the Y coordinate values Ye of the ending points of the circumscribed rectangles. In this exemplary embodiment, the CPU 1 extracts the values Ye, lower than the half of the defined height H, from the values Ye obtained from the circumscribed rectangles. Based on the extracted values Ye, a regression line, which indicates the characteristics of the extracted values Ye, is drawn using any one of the known methods. This regression line is used as the baseline of the character line.

Figure 8:
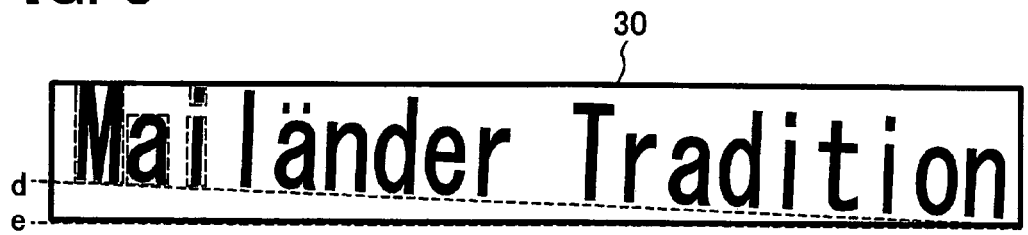
FIG. 8 is an illustration of an exemplary skewed character line, according to an exemplary embodiment of the present invention.

Instead of drawing the regression line, the baseline may be determined by any other method. For example, the baseline may be determined by drawing a straight line passing through the ending point of the circumscribed rectangle arranged last in the character line. However, if a skewed character line 30 is extracted as illustrated in FIG. 8, the baseline may be defined incorrectly as indicated by "e" in FIG. 8. The baseline, e, may be adjusted to the baseline, d, by drawing the regression line, which fits the ending points of the circumscribed rectangles in the character line 30.

Referring back to FIG. 6, Step S43 obtains layout information of the circumscribed rectangles in the character line, and normalizes the layout information.

The layout information of the circumscribed rectangles in the character line differs depending on the orientation of the character line. Further, the layout information varies depending on the language type used in the characters in the character line. In this exemplary embodiment, one or more parameters may be extracted from the circumscribed rectangle as the layout information, including the height Ys starting from the baseline, the height h, and the width w, as illustrated in FIG. 7. The layout information is later used to detect the orientation of the character line.

Figure 9A:
FIG. 9A is an illustration of an exemplary horizontal character line having English characters.

As shown in FIG. 9A, an English character line mainly includes two types of characters: a capital character (i.e., an upper-case letter) such as "W"; and a small character (i.e., a lower-case letter) such as "h". In addition to these character types, a punctuation mark such as an apostrophe " ' " or a period "." may exist.

In the English character line, the heights Ys of the circumscribed rectangles starting from the baseline may be classified into two groups. The capital character has relatively a large height Ys with respect to the baseline as indicated by the "a" in FIG. 9A. The small character has relatively a low height Ys with respect to the baseline as indicated by the "b" in FIG. 9A. Similarly, the heights h of the circumscribed rectangles may be classified into two groups. In FIG. 9A, the characters "W", "h", "y", "t", "f", and "d" have relatively large heights h, while the characters "w", "o", "a", and "s" have relatively small heights h. The widths of the English characters are substantially the same, except for the punctuation marks.

If the English character line of FIG. 9A is rotated from the upright position, these characteristics that can be expressed by the above-described parameters change. By analyzing the parameters of the circumscribed rectangles, the orientation of the character line may be detected.

The above-described characteristics may also be common to other Latin languages such as French, Spanish, Italian, German, etc.

Figure 9B:
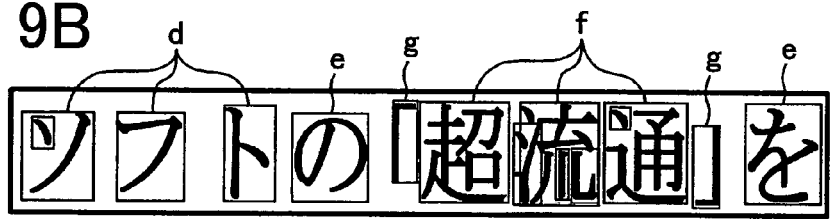
FIG. 9B is an illustration of an exemplary horizontal character line having Japanese characters.

As shown in FIG. 9B, a Japanese character line mainly includes three types of characters: a katakana character indicated by the "d", a hiragana character indicated by the "e", and a kanji character indicated by the "f". In addition to these character types, a mark such as quotation mark indicated by the "g" or punctuation mark may exist.

In the Japanese character line, the heights Ys of the circumscribed rectangles starting from the baseline may vary, especially when more than one circumscribed rectangles are formed for one character as illustrated in the kanji character f. Similarly, the heights h or the widths w of the circumscribed rectangles may vary, especially when more than one circumscribed rectangle is formed for one character.

If the Japanese character line of FIG. 9B is rotated from the upright position, these characteristics that can be expressed by the above-described parameters change. By analyzing the parameters of the circumscribed rectangles, the orientation of the character line may be detected.

The above-described characteristics may also be common to other Asian languages such as Chinese and Korean.

Once the layout information is obtained for each of the circumscribed rectangles in the character line, the layout information is normalized to be within a range between 0 and 1. For example, the height Ys is normalized with respect to the height H of the character line to obtain the normalized height YsRate=Ys/H. Similarly, the height h and the width w are normalized with respect to the height H of the character line, respectively, to obtain the normalized height hRate=h/H and the normalized width wRate w/H.

Referring back to FIG. 6, Step S44 converts the layout information of the character line into a set of symbols.

The character line includes a plurality of characters arranged from left to right in the character line. Since each of the characters can be expressed by one or more circumscribed rectangles, and each of the circumscribed rectangles can be expressed by layout information, the character line can be expressed by a time series of layout information. Further, using any one of the known quantizing methods, the time series of layout information can be quantized into a set of discrete symbols.

Figure 10A:
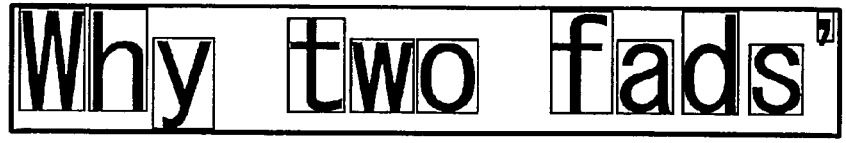
FIG. 10A is an illustration of an operation for converting the character line of FIG. 9A to a set of symbols, according to an exemplary embodiment of the present invention.
Figure 10B:
FIG. 10B is an illustration of an operation for converting the character line of FIG. 9B to a set of symbols, according to an exemplary embodiment of the present invention.

For example, if the normalized height YsRate is obtained as the layout information, the normalized height YsRate can be quantized into a number of integer values as described in the equation: INT(YsRate*(N-1)), wherein N corresponds to a number of quantization levels. In this exemplary embodiment, the normalized height YsRate is quantized into 15 levels. Each of the obtained values is further assigned with an identification (ID) label. In this way, as illustrated in FIG. 10A, the English character line of FIG. 9A may be converted into a set of symbols s021, s124, s032, s048, s012, etc., based on the heights Ys of the circumscribed rectangles. Similarly, as illustrated in FIG. 10B, the Japanese character line of FIG. 9B may be converted into a set of symbols s243, s086, s045, s189, s211, etc., based on the heights Ys of the circumscribed rectangles.

In another example, if the normalized height hRate is obtained as the layout information, the normalized height hRate can be quantized into a number of integer values as described in the equation: INT(hRate*(N-1)), wherein N corresponds to a number of quantization levels. In this exemplary embodiment, the normalized height, hRate, may be quantized into eight levels. Additionally, each of the obtained values is further assigned with an ID label.

In yet another example, if the normalized width wRate is obtained as the layout information, the normalized width wRate can be quantized into a number of integer values as described in the equation: INT(wRate*(N-1)), wherein N corresponds to a number of quantization levels. In this exemplary embodiment, the normalized width, wRate, may be quantized into two levels. Additionally, each of the obtained values is further assigned with an ID label.

Alternatively, any combination including the above-described parameters YsRate, hRate, and wRate may be used for quantizing. For example, the character line can be expressed by a time series of three-dimensional vectors, which is defined by the parameters YsRate, hRate, and wRate. Using any one of the known vector quantizing methods, the time series of three-dimensional vectors can be quantized into a set of symbols, which can be expressed in one dimension. In this exemplary embodiment, the normalized height YsRate, the normalized height hRate, and the normalized width wRate are quantized, respectively, into 15 levels, 8 levels, and 2 levels. The quantized layout information is further assigned with an ID level selected from 240 ID levels.

Figures 11, 12:
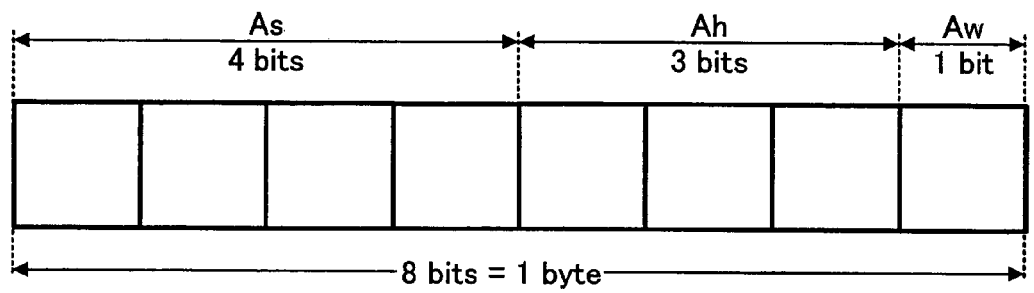
FIG. 11 is a structure of data including a set of symbols according to an exemplary embodiment of the present invention.
FIG. 12 is an exemplary trigram table stored in the image processing apparatus of FIG. 1, according to an exemplary embodiment of the present invention.

Further, the quantized layout information can be expressed by 8-bit data, i.e., 1 byte data, as illustrated in FIG. 11. As shown in FIG. 11, the normalized height YsRate is stored as 4-bit data in a data area, As. The normalized height hRate is stored as 3-bit data in a data area, Ah. The normalized width wRate is stored as 1-bit data in a data area, Aw.

Referring back to FIG. 6, Step S45 calculates occurrence probability of the set of symbols for each of the predetermined orientations of the character line, using at least one of the n-gram models stored in the NVRAM 5.

As described above, the NVRAM 5 stores the n-gram models trained on the Asian reference document image having eight orientations, and the n-gram models trained on the Latin reference document image having four orientations. Further, in this exemplary embodiment, a trigram model is used as the n-gram model for detecting an orientation of characters.

First, the CPU 1 selects one of the trigram models, either arbitrarily or in a predetermined order. For example, the CPU 1 selects the trigram model for the orientation HL0. The CPU 1 selects three consecutive symbols including s013, s045, and s032, for example, from the set of symbols. Using the selected trigram model, the CPU 1 calculates the occurrence probability of the symbol s032, indicating the probability of which the symbol s032 follows the symbols s013 and s045, using the equation:

$$P(W)=\pi(i=1, n)P(Wi|Wi\text{-}2, Wi\text{-}1), \text{ wherein } Wi\text{-}2, Wi\text{-}1, \text{ and } Wi$$

correspond to three consecutive symbols.

The CPU 1 stores the calculated occurrence probability in a table in a corresponding manner with information for identifying the three consecutive symbols s013, s045, and s032, as illustrated in FIG. 12, for example. At this time, the CPU 1 may convert the occurrence probability to an integer value by multiplying the log of the occurrence probability with (−1000) to facilitate computation. This integer value may be referred to as a score.

Similarly, the CPU 1 calculates the occurrence probability for each set of the three consecutive symbols in the character line, and stores the occurrence probability in the table of FIG. 12. From the obtained occurrence probabilities, the occurrence probability of the character line is calculated for the orientation HL0.

This calculation is performed for each of the orientations HL0, HL90, HL180, HL270, VL0, VL90, VL180, and VL270. As a result, the occurrence probabilities of the character line for the orientations HL0, HL90, HL180, HL270, VL0, VL90, VL180, and VL270 are generated, as illustrated in FIG. 3.

The CPU 1 then selects one of the orientations having the largest value of occurrence probability, i.e., the smallest value of the score. The CPU 1 determines that the orientation of the character line corresponds to the selected orientation having the largest occurrence probability. For example, referring to FIG. 3, the CPU 1 selects the orientation HL0 having the lowest score of 23098, and determines that the orientation of the character line is HL0.

In this exemplary embodiment, a trigram model is used as the n-gram model, however, any kind of n-gram model may be used, such as a bi-gram model.

Further, before selecting the trigram model, the CPU 1 may first detect the language type of the character line using the layout information. In this exemplary embodiment, the CPU 1 determines whether the character line corresponds to the Latin language or the Asian language using the layout information obtained from the circumscribed rectangles of the character line. If the character line corresponds to the Asian language, the CPU 1 selects the trigram models trained on the Asian reference document image, one by one, for each of the orientations. If the character line corresponds to the Latin language, the CPU 1 selects the trigram models trained on the Latin reference document image, one by one, for each of the orientations.

Furthermore, in addition to the occurrence probability, the CPU 1 may use other parameters for determining the orientation of the character line.

For example, in some cases, the largest value of occurrence probability may be larger than a second largest value of occurrence probability by only a small amount. For improved accuracy, the CPU 1 may determine whether the largest value of occurrence probability is larger by a predetermined amount than the second largest value of occurrence probability. If the largest value is larger by the predetermined amount, the CPU 1 will select the orientation having the largest value of occurrence probability for the orientation of the character line. If the largest value is not large enough, the CPU 1 may determine that the orientation of the character line is undetectable.

Once the orientation is detected for all of the character lines extracted in Step S2 of FIGS. 2 and 3, the CPU 1 analyzes the detection results (Step S5), and determines an orientation of the document image based on the analysis (Step S6).

For example, the CPU 1 may analyze the detection results obtained in Step S4 as a table shown in FIG. 3. The table of FIG. 3 indicates how many character lines in the document image corresponds to the orientations including the orientations VL0, VL90, VL180, VL270, HL0, HL90, HL180, and HL270.

In one example, the CPU 1 may select the orientation having a largest number of the character lines as the orientation of the document image. Referring to FIG. 3, the orientation HL having the largest number of 68 would be selected.

However, in some exemplary cases, the largest number of the character lines may be larger than a second largest number of the character line by only a small amount. For example, the orientation of the Asian character line may not be properly detected if one circumscribed rectangle is extracted for each of the characters, which is substantially symmetric in four directions (up, bottom, left, and right). In another example, the horizontal or vertical direction of the character line may be determined incorrectly in Step S2, depending on the distance between the two adjacent characters in the character line.

For improved accuracy, the CPU 1 may determine whether the largest number of the character lines is larger by a predetermined amount than the second largest number of the character lines. If the largest number is larger by the predetermined amount, the CPU 1 will select the orientation having the largest number for the orientation of the document image. If the largest number is not large enough, the CPU 1 may determine that the orientation of the document image is undetectable.

In an alternative to using the predetermined amount, the CPU 1 may consider the number of characters contained in each of the character lines. By selecting the character line having a relatively large number of characters, the accuracy may be improved.

After determining the orientation of the document image, the CPU 1 may further correct the orientation of the document image if the determined orientation does not correspond to the upright position, using any one of the known methods. The document image having the right orientation may be further stored in the HDD 3, or it may be printed out using a printer.

The steps illustrated in FIG. 6 may also be performed in any order or in various other ways as apparent to those skilled in the art. For example, any other kinds of parameters may be extracted from the circumscribed rectangle as layout information in Step S43, in addition or alternative to the parameters including the height Ys, the height h, and the width w of the circumscribed rectangles.

In one example, the number of black pixels present in the circumscribed rectangles may be extracted in Step S43, in addition to any one of the parameters described above. The number of black pixels, i.e., the density of black pixels, contained in the character line differs for each of the language types. For example, as illustrated in FIGS. 9A and 9B, the density of black pixels tends to be relatively low in the English character line, while the density of black pixels tends to be relatively high in the Japanese character line. Thus, the density of black pixels may facilitate an operation of detecting the language type of the character line, which may be performed in Step S45.

The number of black pixels may be normalized with respect to the total number of black pixels contained in the character line to obtain the normalized number of black pixels ("normalized black pixel number"). The normalized black pixel number can be converted into a set of symbols, using any kind of the known quantizing methods.

In another example, a parameter of the circumscribe rectangle indicating the relationship with other circumscribed rectangles in the character line may be extracted in Step S43, in addition or in alternative to any one of the parameters described above. The distance of the two adjacent character lines differs for each of the language types. For example, as illustrated in FIG. 9A, the English character line contains relatively a large number of spaces, each space corresponding to the standard size of the circumscribed rectangle. As illustrated in FIG. 9B, the Japanese character line contains relatively a small number of spaces. Further, as illustrated in FIG. 9A, the apostrophe may generate a space at a lower portion of the English character line. Thus, by analyzing the distances of the circumscribed rectangles in the character line, the orientation of the character line may be detected.

Figure 13:
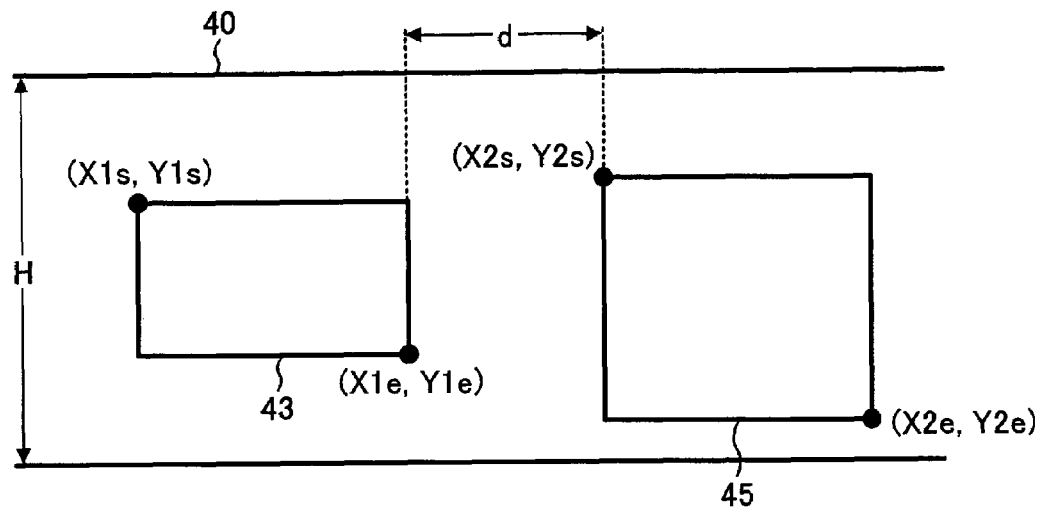
FIG. 13 is an illustration of exemplary circumscribed rectangles adjacent to each other, according to an exemplary embodiment of the present invention.

Referring to FIG. 13, the distance d with respect to the circumscribed rectangle 45, which is arranged right of the circumscribed rectangle 43, may be extracted as the layout information. The distance d may be obtained as the difference ($X2s-X1e$) between the X coordinate $X2s$ of the starting point of the adjacent circumscribed rectangle 45 and the X coordinate $X1e$ of the ending point of the circumscribed rectangle 43. In this exemplary embodiment, the distance d is assumed to have a value larger than 0. However, the distance d may have a negative value in some cases including the case in which two adjacent circumscribed rectangles are overlapped in the horizontal direction, i.e., the X axis.

The distance d of the circumscribed rectangle may be normalized with respect to the height H of the character line to obtain the normalized distance dRate=d/H. The normalized distance dRate can be quantized into a number of integer values as described in the equation: INT((dRate*(N-1))+B), wherein N corresponds to a number of quantization levels and B corresponds to a predetermined constant. Each of the obtained values is further assigned with an ID label.

Figure 14:
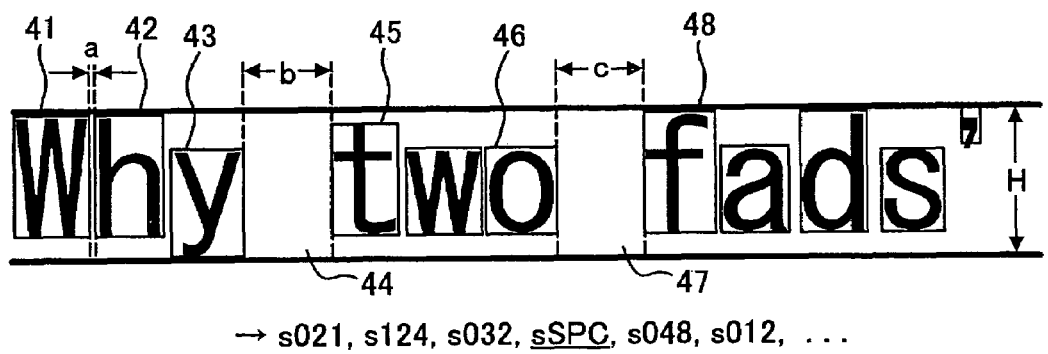
FIG. 14 is an illustration of an operation for converting the character line of FIG. 9A to a set of symbols, according to an exemplary embodiment of the present invention.

As illustrated in FIG. 14, the space contained in the English character line of FIG. 9A may be converted to a symbol sSPC based on the distance d of the circumscribed rectangle. In FIG. 14, the distance, a, between the characters 41 and 42 is not converted into a symbol, as it has a value smaller than a predetermined value defined by the constant B. For example, if the predetermined value is set to 0.25, the distance, a, having a value smaller than 0.25 is not converted into a symbol. The distance b between the characters 43 and 45, and the distance c between the characters 46 and 48, each having a value larger than 0.25, are converted, respectively, to the symbols sSPC.

Further, in this exemplary embodiment, more than one symbol sSPC may be assigned to the space in the character line, depending on the value of the distance d. For example, if the distance d value has a negative value, a symbol different from the symbol sSPC may be assigned to the space having the distance d.

Furthermore, as described above, the distance d may be combined with any number of the above-described parameters. For example, the character line can be expressed by a time series of four dimensional vectors, which is defined by the parameters YsRate, hRate, wRate, and dRate. Further, the layout information defined by these parameters can be expressed by 8-bit data as illustrated in FIG. 11. Since 240 symbols can be assigned for the parameters including YsRate, hRate, and wRate, 16 symbols can be assigned for the parameter dRate.

Numerous additional modifications and variations are additionally possible in light of the above teachings. It is therefore to be understood that within the scope of the appended claims, the disclosure of this patent specification may be practiced in ways other than those specifically described herein. For example, elements and/or features of different illustrative embodiments may be combined with each other and/or substituted for each other within the scope of this disclosure and appended claims.

Further, any one of the above-described and other operations of detecting an orientation may be applied to a selected portion of a document image.

Figure 15:
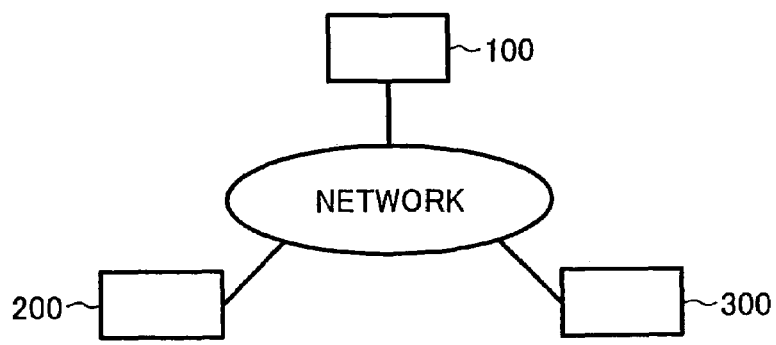
FIG. 15 is a schematic block diagram illustrating an image processing system, according to an exemplary embodiment of the present invention.

Furthermore, as illustrated in FIG. 15, the computer program stored in the ROM 2 may be provided to image processing apparatuses 200 and 300 via a network. Having the program downloaded from the network, each of the image processing apparatuses 200 and 300 becomes capable of detecting an orientation of characters in a document image.

Furthermore, as described above, any one of the above-described and other methods of the present invention may be embodied in the form of a computer program stored in any kind of storage medium. Examples of storage mediums include, but are not limited to, flexible disks, hard disks, optical discs, magneto-optical discs, magnetic tapes, in-volatile memory cards, ROM (read-only-memory), etc.

Alternatively, any one of the above-described and other methods of the present invention may be implemented by ASIC; prepared by interconnecting an appropriate network of conventional component circuits or by a combination thereof with one or more conventional general purpose microprocessors; and/or signal processors programmed accordingly.

This patent application is based on and claims priority to Japanese patent application, No. JP 2004-211884 filed on Jul. 20, 2004, in the Japanese Patent Office, the entire contents of which are incorporated by reference herein.

What is claimed as new and desired to be protected by Letters Patent of the United States is:

1. An image processing method, comprising: using a processor to perform the steps of:
    extracting a predetermined number of consecutive characters from a document image;
    converting the consecutive characters into a set of symbols using layout information obtained from the consecutive characters; and
    detecting an orientation of the consecutive characters based on occurrence probabilities of the set of symbols obtained using a plurality of reference images, each reference image corresponding to one of the predetermined orientations,
    wherein the plurality of reference images includes four types of reference images, each type corresponding to one of four orientations, the four types of reference images being prepared for at least one of a vertical character line and a horizontal character line.

2. The method of claim 1, further comprising the step of:
    determining an orientation of the document image based on the detected orientation of the consecutive characters.

3. The method of claim 1, wherein the converting step comprises the steps of:
    forming one or more circumscribed rectangles for each of the consecutive characters; and
    extracting one or more parameters from each of the circumscribed rectangles, the parameters being used as the layout information.

4. The method of claim 3, wherein the parameters are selected from a group consisting of:
    a height of the circumscribed rectangle starting from a baseline of the circumscribed rectangles;
    a height of the circumscribed rectangle;
    a width of the circumscribed rectangle;
    a distance of the circumscribed rectangle with respect to one of the circumscribed rectangles arranged adjacent to the circumscribed rectangle; and
    a number of black pixels contained in the circumscribed rectangle.

5. The method of claim 3, wherein the converting step further comprises the steps of:
    forming a character line based on a plurality of circumscribed rectangles of the one or more circumscribed rectangles, the plurality of circumscribed rectangles being located closely to each other; and
    normalizing each of the parameters with respect to the character line using a line parameter obtained from the character line, the normalized parameters being used as the layout information.

6. An image processing method, comprising: using a processor to perform the steps of:
    extracting a predetermined number of consecutive characters from a document image;
    converting the consecutive characters into a set of symbols using layout information obtained from the consecutive characters; and
    detecting an orientation of the consecutive characters based on occurrence probabilities of the set of symbols obtained using a plurality of reference images, each reference image corresponding to one of the predetermined orientations,
    wherein the converting step comprises the steps of:
        quantizing the layout information into a set of integers; and
        assigning each of the integers with the corresponding symbol to generate the set of symbols.

7. The method of claim 6, wherein the quantizing step uses a vector quantization method.

8. An image processing method comprising: using a processor to perform the steps of:
    extracting a predetermined number of consecutive characters from a document image;
    converting the consecutive characters into a set of symbols using layout information obtained from the consecutive characters; and
    detecting an orientation of the consecutive characters based on occurrence probabilities of the set of symbols obtained using a plurality of reference images, each reference image corresponding to one of the predetermined orientations,
    wherein the set of symbols are expressed as 8-bit data.

9. An image processing method comprising: using a processor to perform the steps of:
    extracting a predetermined number of consecutive characters from a document image;
    converting the consecutive characters into a set of symbols using layout information obtained from the consecutive characters; and
    detecting an orientation of the consecutive characters based on occurrence probabilities of the set of symbols obtained using a plurality of reference images, each reference image corresponding to one of the predetermined orientations,
    wherein the detecting step comprises the steps of:
        obtaining a plurality of n-gram models each trained on one of the plurality of reference images;
        calculating the occurrence probabilities of the set of symbols for each of the predetermined orientations using the n-gram models; and
        selecting one of the predetermined orientations corresponding to the occurrence probability having a largest value.

10. The method of claim 9, wherein the selected orientation is used as the detected orientation of the consecutive characters.

11. The method of claim 9, wherein the plurality of reference images are each generated based on a specific language.

12. The method of claim 9, wherein the detecting step further comprises the step of:
    detecting a language type of the character line using the set of symbols,
    wherein the plurality of reference images correspond to the detected language type.

13. The method of claim 9, wherein the detecting step further comprises the step of:
    determining whether the largest value of the occurrence probability is larger by a predetermined amount than a second largest value of the occurrence probability to generate a determination result,
    wherein the selected orientation is used as the detected orientation of the consecutive characters based on the determination result.

14. An image processing method, comprising: using a processor to perform the steps of:
    forming one or more character lines based on a plurality of consecutive characters extracted from a document image, each of the character lines having a plurality of consecutive characters;
    converting the plurality of consecutive characters in the character lines into a set of symbols using layout information obtained from the plurality of consecutive characters in the character line;
    detecting an orientation of one or more of the character lines based on occurrence probabilities of the set of symbols obtained using a plurality of reference images, each reference image corresponding to one of the predetermined orientations; and
    determining an orientation of the document image based on the detected orientations of the character lines, wherein the determining step comprises the steps of:
        calculating, for each of the detected orientations, a number of character lines corresponding to the detected orientations; and
        selecting one of the detected orientations having a largest number of character lines.

15. The method of claim 14, wherein the selected detected orientation is used as the determined orientation of the document image.

16. The method of claim 14, wherein the determining step further comprises the step of:
    determining whether the largest number of the selected orientation is larger by a predetermined value than a second largest number of the detected orientation to generate a determination result,
    wherein the selected orientation is used as the determined orientation of the document image based on the determination result.

17. An image processing method, comprising: using a processor to perform the steps of:
    forming one or more character lines based on a plurality of consecutive characters extracted from a document image, each of the character lines having a plurality of consecutive characters;
    converting the plurality of consecutive characters in the character lines into a set of symbols using layout information obtained from the plurality of consecutive characters in the character line;
    detecting an orientation of one or more of the character lines based on occurrence probabilities of the set of symbols obtained using a plurality of reference images, each reference image corresponding to one of the predetermined orientations; and
    determining an orientation of the document image based on the detected orientations of the character lines, wherein the determining step comprises the steps of:
        obtaining, for each of the one or more character lines, the number of symbols contained in the character line; and
        selecting one of the detected orientations based on the obtained number of symbols.

18. An image processing apparatus, comprising:
    means for extracting a predetermined number of consecutive characters from a document image;
    means for converting the predetermined number of consecutive characters into a set of symbols using layout information obtained from the predetermined number of consecutive characters; and
    means for detecting an orientation of the predetermined number of consecutive characters based on occurrence probabilities of the set of symbols obtained using a plurality of reference images, each reference image corresponding to one of the predetermined orientations,
    wherein the plurality of reference images includes four types of reference images, each type corresponding to one of four orientations, the four types of reference images being prepared for at least one of a vertical character line and a horizontal character line.

19. The image processing apparatus of claim 18, further comprising:

means for determining an orientation of the document image based on the detected orientation of the predetermined number of consecutive characters.

20. The image processing apparatus of claim 19, further comprising: means for inputting the document image.

21. The image processing apparatus of claim 20, further comprising:

means for correcting the orientation of the document image based on the determined orientation of the document image.

22. The image processing apparatus of claim 21, further comprising:

means for outputting the document image having the orientation being corrected.

23. An image processing apparatus comprising:

means for extracting a predetermined number of consecutive characters from a document image;

means for converting the consecutive characters into a set of symbols using layout information obtained from the consecutive characters;

means for detecting an orientation of the consecutive characters based on occurrence probabilities of the set of symbols obtained using a plurality of reference images, each reference image corresponding to one of predetermined orientations; and means for storing a plurality of n-gram models each trained on one of a plurality of reference document images, wherein at least one of the plurality of n-gram models is used by the detecting means to detect the orientation of the consecutive characters.

24. An image processing system, comprising:

a processor; and a storage device configured to store a plurality of instructions which, when activated by the processor, cause the processor to perform an image processing operation comprising:

extracting a predetermined number of consecutive characters from a document image;

converting the predetermined number of consecutive characters into a set of symbols using layout information obtained from the predetermined number of consecutive characters; and detecting an orientation of the predetermined number of consecutive characters based on occurrence probabilities of the set of symbols obtained using a plurality of reference images, each reference image corresponding to one of the predetermined orientations, wherein the plurality of reference images includes four types of reference images, each type corresponding to one of four orientations, the four types of reference images being prepared for at least one of a vertical character line and a horizontal character line.

25. The image processing system of claim 24, wherein the image processing operation further comprises:

determining an orientation of the document image based on the detected orientation of the predetermined number of consecutive characters.

26. A computer readable medium storing computer instructions for performing an image processing operation comprising:

extracting a predetermined number of consecutive characters from a document image;

converting the predetermined number of consecutive characters into a set of symbols using layout information obtained from the predetermined number of consecutive characters; and detecting an orientation of the predetermined number of consecutive characters based on occurrence probabilities of the set of symbols obtained using a plurality of reference images, each reference image corresponding to one of the predetermined orientations, wherein the plurality of reference images includes four types of reference images, each type corresponding to one of four orientations, the four types of reference images being prepared for at least one of a vertical character line and a horizontal character line.

27. The medium of claim 26, wherein the image processing operation further comprises:

determining an orientation of the document image based on the detected orientation of the predetermined number of consecutive characters.

28. An image processing method comprising: using a processor to perform the steps of:

extracting a predetermined number of consecutive characters from a document image;

converting the consecutive characters into a set of symbols using layout information obtained from the consecutive characters; and detecting an orientation of the consecutive characters based on occurrence probabilities of the set of symbols obtained using a plurality of reference images, each reference image corresponding to one of the predetermined orientations, wherein the predetermined number of consecutive characters is three for trigrams.

29. An image processing apparatus comprising:

means for extracting a predetermined number of consecutive characters from a document image;

means for converting the consecutive characters into a set of symbols using layout information obtained from the consecutive characters; and means for detecting an orientation of the consecutive characters based on occurrence probabilities of the set of symbols obtained using a plurality of reference images, each reference image corresponding to one of predetermined orientations, wherein the predetermined number of consecutive characters is three for trigrams.

30. An image processing apparatus comprising:

means for extracting a predetermined number of consecutive characters from a document image;

means for converting the consecutive characters into a set of symbols using layout information obtained from the consecutive characters; and means for detecting an orientation of the consecutive characters based on occurrence probabilities of the set of symbols obtained using a plurality of reference images, each reference image corresponding to one of predetermined orientations, wherein the plurality of reference images includes four types of reference images, each type corresponding to one of four orientations, the four types of reference images being prepared for at least one of a vertical character line and a horizontal character line.

31. An image processing system comprising:

a processor; and a storage device configured to store a plurality of instructions, which when activated by the processor, cause the processor to perform an image processing operation comprising:

extracting a predetermined number of consecutive characters from a document image;

converting the predetermined number of consecutive characters into a set of symbols using layout information obtained from the predetermined number of consecutive characters; and detecting an orientation of the predetermined number of consecutive characters based on occurrence probabilities of the set of symbols obtained using a plurality of reference images, each reference image corresponding to one of predetermined orientations, wherein the predetermined number of consecutive characters is three for trigrams.

32. An image processing system comprising:

a processor; and a storage device configured to store a plurality of instructions, which when activiated by the processor, cause the processor to perform an image processing operation comprising:

extracting a predetermined number of consecutive characters from a document image;

converting the predetermined number of consecutive characters into a set of symbols using layout information obtained from the predetermined number of consecutive characters; and detecting an orientation of the predetermined number of consecutive characters based on occurrence probabilities of the set of symbols obtained using a plurality of reference images, each reference image corresponding to one of predetermined orientations, wherein the plurality of reference images includes four types of reference images, each type corresponding to one of four orientations, the four types of reference images being prepared for at least one of a vertical character line and a horizontal character line.

33. A computer readable medium storing computer instructions for performing an image processing operation comprising:

extracting a predetermined number of consecutive characters from a document image;

converting the consecutive characters into a set of symbols using layout information obtained from the consecutive characters; and detecting an orientation of the consecutive characters based on occurrence probabilities of the set of symbols obtained using a plurality of reference images, each reference image corresponding to one of predetermined orientations, wherein the predetermined number of consecutive characters is three for trigrams.

34. A computer readable medium storing computer instructions for performing an image processing operation comprising:

extracting a predetermined number of consecutive characters from a document image;

converting the consecutive characters into a set of symbols using layout information obtained from the consecutive characters; and detecting an orientation of the consecutive characters based on occurrence probabilities of the set of symbols obtained using a plurality of reference images, each reference image corresponding to one of predetermined orientations, wherein the plurality of reference images includes four types of reference images, each type corresponding to one of four orientations, the four types of reference images being prepared for at least one of a vertical character line and a horizontal character line.

* * * * *

UNITED STATES PATENT AND TRADEMARK OFFICE
CERTIFICATE OF CORRECTION

| | |
|---|---|
| PATENT NO. | : 7,580,571 B2 |
| APPLICATION NO. | : 11/183852 |
| DATED | : August 25, 2009 |
| INVENTOR(S) | : Yoshihisa Ohguro |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 891 days.

Signed and Sealed this

Fourteenth Day of September, 2010

David J. Kappos
*Director of the United States Patent and Trademark Office*